US012619737B2

(12) United States Patent
Misra et al.

(10) Patent No.:    US 12,619,737 B2
(45) Date of Patent:        May 5, 2026

(54) METHOD AND SYSTEM FOR SECURITY RISK IDENTIFICATION AND CONTROLLING RELEASE MANAGEMENT OF SOFTWARE APPLICATION WITH VULNERABLE CODES

(71) Applicant: ArmorCode Inc., Fremont, CA (US)

(72) Inventors: Anant Misra, Cupertino, CA (US); Nikhil Gupta, Saratoga, CA (US); Mark Lloyd Lambert, La Verne, CA (US)

(73) Assignee: ArmorCode Inc., Fremont, CA (US)

( * ) Notice: Subject to any disclaimer, the term of this patent is extended or adjusted under 35 U.S.C. 154(b) by 315 days.

(21) Appl. No.: 18/329,933

(22) Filed: Jun. 6, 2023

(65) Prior Publication Data

US 2023/0394159 A1      Dec. 7, 2023

Related U.S. Application Data

(60) Provisional application No. 63/349,572, filed on Jun. 6, 2022.

(51) Int. Cl.
G06F 21/57          (2013.01)
G06F 21/55          (2013.01)

(52) U.S. Cl.
CPC .......... G06F 21/577 (2013.01); G06F 21/554 (2013.01); G06F 2221/033 (2013.01)

(58) Field of Classification Search
CPC ............. G06F 2221/033; G06F 21/577; G06F 21/554; G06F 21/552; G06F 21/562; G06F 21/566; G06F 21/51; G06F 11/36; G06F 11/362; G06F 11/366
See application file for complete search history.

(56)                References Cited

U.S. PATENT DOCUMENTS

| | | | | |
|---|---|---|---|---|
| 10,838,846 B1 * | 11/2020 | Saleh-Esa | ........... | G06F 11/3698 |
| 11,256,590 B1 * | 2/2022 | Hulick, Jr. | ............. | G06Q 10/06 |
| 2014/0201218 A1 * | 7/2014 | Catalano | .............. | H04L 47/803 |
| | | | | 707/748 |
| 2016/0124742 A1 * | 5/2016 | Rangasamy | ............ | H04L 41/20 |
| | | | | 717/103 |
| 2016/0170741 A9 * | 6/2016 | Fiebig | ........................ | G06F 8/35 |
| | | | | 717/121 |
| 2017/0003948 A1 * | 1/2017 | Iyer | ..................... | H04L 41/5054 |
| 2017/0235662 A1 * | 8/2017 | Leask | .................... | G06Q 10/00 |
| | | | | 717/125 |
| 2019/0026472 A1 * | 1/2019 | Adam | ................... | G06F 21/563 |
| 2019/0129701 A1 * | 5/2019 | Hawrylo | .................. | G06F 8/71 |

(Continued)

*Primary Examiner* — Alexander Lagor
*Assistant Examiner* — Taylor P Vu
(74) *Attorney, Agent, or Firm* — Dickinson Wright PLLC

(57)                ABSTRACT

The embodiments herein provide a method and a system for security risk identification and controlling release management of software application. The method provides security risk identification in a software application as well as integrated tools to direct the efforts of developers to build and maintain secure software. The method provides a unique approach of defining a plurality of Service Level Agreement (SLA) to control a release build for a software application by checking vulnerabilities. Furthermore, the method is flexible enough to adapt in most complicated enterprises and different Software Development Life Cycle (SDLC) processes.

14 Claims, 5 Drawing Sheets

(56)     References Cited

U.S. PATENT DOCUMENTS

| | | | |
|---|---|---|---|
| 2019/0305957 A1* | 10/2019 | Reddy | G06F 8/60 |
| 2020/0019393 A1* | 1/2020 | Vichare | G06N 20/00 |
| 2020/0201748 A1* | 6/2020 | Burrell | G06F 8/41 |
| 2020/0341752 A1* | 10/2020 | Lim | G06F 8/75 |
| 2021/0012223 A1* | 1/2021 | Wu | G06F 16/38 |
| 2021/0209226 A1* | 7/2021 | Sundararajan | G06F 21/562 |
| 2021/0326239 A1* | 10/2021 | Vaughan | G06F 8/77 |
| 2022/0114251 A1* | 4/2022 | Guim Bernat | H04L 41/5025 |
| 2023/0021414 A1* | 1/2023 | Kumar | G06F 21/577 |
| 2023/0029624 A1* | 2/2023 | Olejarz | G06F 8/77 |

* cited by examiner

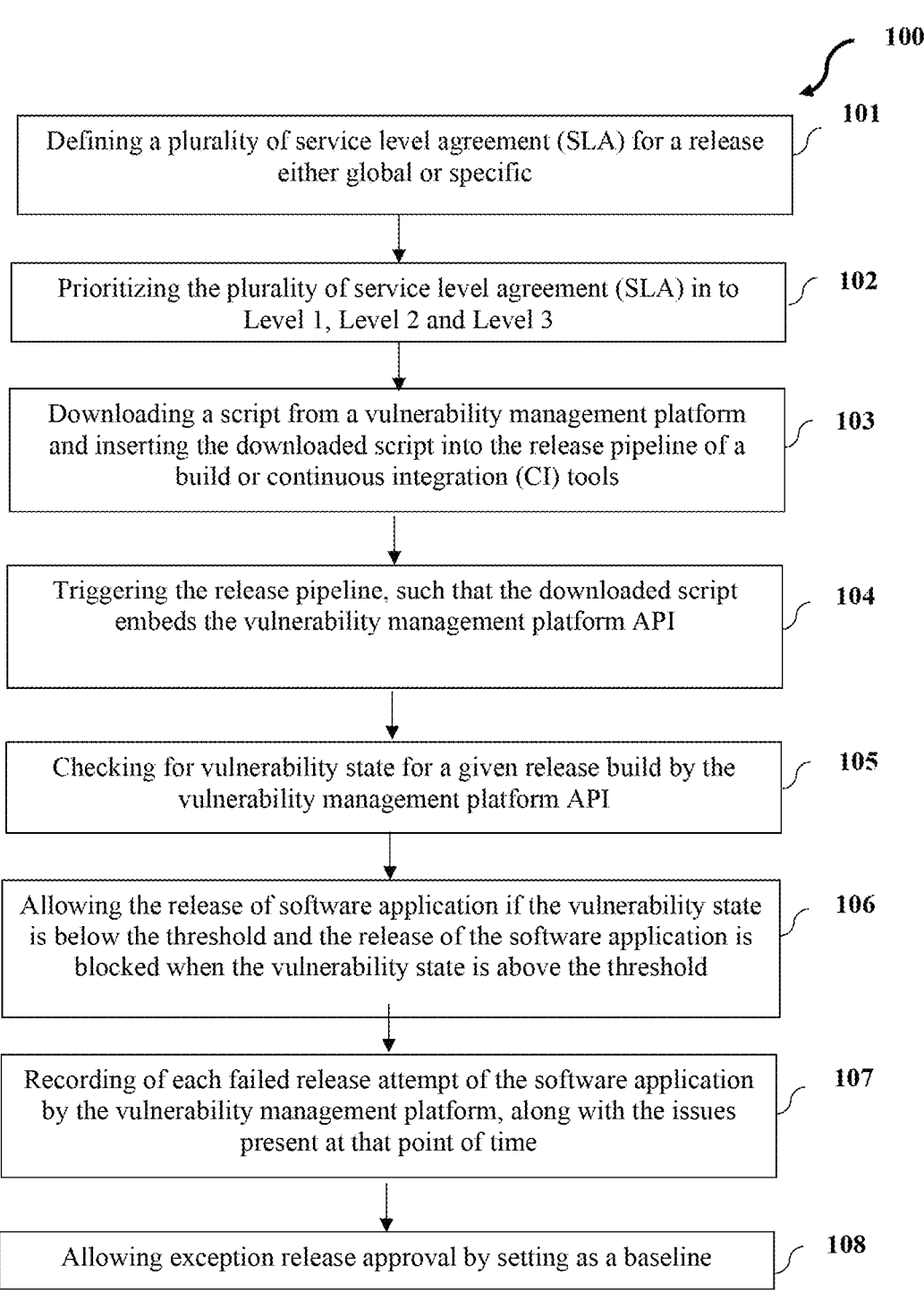

100

Defining a plurality of service level agreement (SLA) for a release either global or specific — 101

Prioritizing the plurality of service level agreement (SLA) in to Level 1, Level 2 and Level 3 — 102

Downloading a script from a vulnerability management platform and inserting the downloaded script into the release pipeline of a build or continuous integration (CI) tools — 103

Triggering the release pipeline, such that the downloaded script embeds the vulnerability management platform API — 104

Checking for vulnerability state for a given release build by the vulnerability management platform API — 105

Allowing the release of software application if the vulnerability state is below the threshold and the release of the software application is blocked when the vulnerability state is above the threshold — 106

Recording of each failed release attempt of the software application by the vulnerability management platform, along with the issues present at that point of time — 107

Allowing exception release approval by setting as a baseline — 108

FIG 1

METHOD AND SYSTEM FOR SECURITY RISK IDENTIFICATION AND CONTROLLING RELEASE MANAGEMENT OF SOFTWARE APPLICATION WITH VULNERABLE CODES

CROSS-REFERENCE TO RELATED APPLICATIONS

The present application claims the priority from the US Provisional Application with Ser. No. 63/349,572 filed on Jun. 6, 2022, with the title "A METHOD AND SYSTEM FOR SECURITY RISK IDENTIFICATION AND CONTROLLING RELEASE MANAGEMENT OF SOFTWARE APPLICATION WITH VULNERABLE CODES". The contents of the abovementioned Provisional Application are included in entirety as reference herein.

BACKGROUND

Technical Field

The embodiments herein are generally related to the field of application security. The embodiments herein are particularly related to a method and system for security risk identification in a software application as well as integrated tools to direct the efforts of developers to build and maintain secure software. The embodiments herein are more particularly related to a method and system for security risk identification in a software application and controlling release of software application with vulnerable codes having vulnerabilities which may pose risk in providing secure software services.

Description of the Related Art

Information security in software is important for all software applications, including those whose primary function is not security. For software developers challenged with coding and maintaining software, there is an overwhelming amount of security-related information, a variety of tools, and numerous identified and unidentified security risks, weaknesses and vulnerabilities that are frequently updated and whose status and level of risk is under constant changes. Software analysts, developers, and testers are often not trained on integrating security features into their code and potential software breaches are too often brought to the attention of developers during emergency situations and/or during quality review and audit. With the ever-changing electronic security landscape, software requires constant updating with relevant security to reduce security risks and prevent breaches. Prevention of security breaches is often more economical than remediation, however keeping abreast of requirements, fixes and breaches can be onerous during the software development and maintenance lifecycle. Software analysts, developers, and testers can therefore be overwhelmed with the amount of available information and variety of tools they can employ and be required to consider long lists of security requirements, guidelines, and standards, and to provide tangible and auditable evidence that software products comply with security guidelines. Security guidance documents are also often static and not updated when modern technologies and vulnerabilities become known, becoming outdated within a short period of time.

Software applications which contain vulnerabilities lead to security and compliance breaches of computer systems. If this occurs, the business of the organization running the application is endangered through loss of critical or protected data, loss of reputation, loss of business, or lawsuits. In addition, the computer system may be damaged or impaired. Therefore, it is best practice of the industry to perform dedicated Application Security Testing (AST) to effectively mitigate these risks.

An established method for looking for security defects Static Application Security Testing (SAST). They analyze an application's source code or bytecode for security vulnerabilities, typically at the initial stages of the software development life cycle (SDLC). Traditional SCA tools were designed for languages with a static type of system. A static type of system enforces certain properties of the code at design time, which cannot be altered at runtime based on the code's control flow. A static type of system therefore makes reasoning about code's behavior without executing the code reliable, while yielding an acceptable false positive rate. "False positive" refers to an erroneously identified problem by the code analysis tool that does not exist. Another standard analysis method is to observe an application in its dynamic running state during execution. It simulates attacks against an application to analyze the reaction of the application to determine whether the software application is vulnerable. This is commonly known as dynamic code analysis or Dynamic Application Security Testing (DAST). The advantage of this approach is the precision of the analysis since no guesses about the code's behavior are necessary. Furthermore, Interactive AST (IAST) combines inside-out observation of a running application being tested with DAST simultaneously. IAST is typically implemented as an agent within the test runtime environment, for example, instrumenting the Java Virtual Machine (JVM), that observes operation or attacks from within the application and identifies vulnerabilities. In the following, IAST is considered as a special type of DAST.

However, Both the DAST and IAST approach have the following limitations. Firstly, to observe the behavior of an application, its code needs to be compiled and executed, which means that the code must be fully functional before it can be analyzed, and an execution environment must be available. Thus, DAST and IAST cannot be used during the initial stages of software development. Secondly, DAST and IAST may cause side effects; for example, database altering code will alter the database while the code is being scanned. Not only does this limit the number of times a scan can be performed, but it also prescribes the times at which a scan can be performed.

In addition, yet another common challenge for Application Security is that there is no great way to control what gets released to production. Once vulnerable code gets released to production, it is already too late to protect the organization from attacks. Furthermore, as the issue move to the right of the SDLC process, it becomes much more expensive to fix the vulnerabilities, as the entire planning, development, QA, user acceptance etc., need to be repeated. Hence, it is a huge challenge when there are a number of testing tools, a number of microservices, different development teams, polyglot development environments, and agile and release at will.

Hence, there is a need for a method and a system for security risk identification and control in a software application, which provides a unique approach to control what gets released, that is flexible enough to adapt in most complicated enterprises and different SDLC processes.

The above-mentioned shortcomings, disadvantages and problems are addressed herein, and which will be understood by reading and studying the following specification.

OBJECTIVES OF THE EMBODIMENTS HEREIN

The primary object of the embodiments herein is to provide a method and a system for security risk identification and controlling release management of software applications with vulnerable codes.

Another object of the embodiments herein is to provide a method and a system for security risk identification and controlling release management of software applications with vulnerable codes with integrated tools to direct the efforts of developers to build and maintain secure software.

Yet another object of the embodiments herein is to provide a method for accepting security risk identified in a software application, by defining a plurality of Service Level Agreement (SLA) to control a release build for a software application by checking vulnerabilities.

Yet another object of the embodiments herein is to provide a method for releasing vulnerable applications based on exceptional release approvals received from CTO, CISO or project management.

These and other objects and advantages of the present invention will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments herein provide a computer-implemented method and system for security risk identification in a software application as well as integrated tools to direct the efforts of developers to build and maintain secure software.

According to one embodiment herein, a method for security risk identification and controlling release management of software applications with vulnerable codes is provided. The method comprises defining a plurality of service level agreement (SLA) for a release globally or specifically. Defining the plurality of SLA globally includes applying the plurality of SLA to all products, subproducts and microservices. In addition, defining the plurality of SLA specifically includes applying the plurality of SLA to a specific product or subproduct or environment, at an application, microservice or at an environment level. The method further includes prioritizing the plurality of service level agreement (SLA) into Level 1, Level 2, and Level 3. The Level 1 plurality of SLA comprises the allowed number of critical, high, medium, and low vulnerabilities that are allowed to pass through the release and any number above the defined threshold are blocked from the release. The Level 2 plurality of SLA defines a list of critical tools, if the defined critical tools are not executed then the release of the software application is blocked from release and the Level 3 plurality of SLA defines flexible risk parameters, including threat intelligence score, and compliance deviance to be implemented. Furthermore, the method includes downloading a script from a vulnerability management platform either as a bash or a python script and inserting the downloaded script into the release pipeline of a build or continuous integration (CI) tools. The vulnerability management platform ingests vulnerabilities from various security scanning tools, penetration testing, manual security research or secure code review results. The method further includes triggering the release pipeline, the downloaded script embedding the vulnerability management platform API and checking for vulnerability state for a given release build by the vulnerability management platform API based on various scanning tools. Moreover, the vulnerability management platform keeps the record of the release of the software application, and also the status of the vulnerability state at that point of time, such that the vulnerability state of the release crosses the desired threshold, the vulnerability management platform API returns a FAIL code, and the release build pipeline of the software application is blocked. The method further includes allowing the release of software application if the vulnerability state is below the threshold and blocking the release of the software application if the vulnerability state is above the threshold. The vulnerability state is determined by accessing the levels of the plurality of SLA, including Level 1, Level 2, and Level 3. Furthermore, the method includes recording of each failed release attempt of the software application in the vulnerability management platform, along with the issues present at that point of time. The method further includes allowing exception release approval by setting a baseline. The exception release approval includes approving the exception in the vulnerability management platform by an authorized person, which allows the release to go live in a subsequent release attempt on the build pipeline.

According to one embodiment herein, the product to which the plurality of SLA, is applied globally is an abstract entity composed of various smaller software deployed separately or all together. The products and sub-products help the method to define a hierarchy of the software applications that are related. An organization that develops software needs to manage their software for maintainability, performance, and team allocation. Completely different software that are separate from each other can be called products or applications. The vulnerability management platform allows customers to set their environment to call this entity either a product or an application.

According to one embodiment herein, the microservice is a special type of sub-product independently developed, tested, and deployed on shared or independent servers, without requiring the other software that builds the product or application. Further, the method being modern application security platform supports this paradigm.

According to one embodiment herein, the method also provides support for different environments within the product or application, and subproduct to reflect the software development process at an organization. The environment includes code branch, and deployment environment where DAST security tools can be run. While defining the plurality of SLA specifically a customer or user needs to define their software inventory in a hierarchical fashion with respect to the vulnerability management platform, such that the findings/vulnerabilities from sub-product/microservices are rolled up to their parent product or application. This helps the customer to view aggregated security flaws/findings/vulnerabilities from all constituents, sub-products or microservices in one place and understand overall risk for the entire product. Furthermore, if needed, a customer can access specific sub-products to see specific findings/vulnerabilities. The vulnerability management platform also supports release gating/blocking of release from getting deployed to the QA environment, or to the production environment. Defining a release gate at QA environment shifts the identification and remediation to the left—a developer release will not be accepted in the QA, which helps in identifying, prioritizing, and fixing issues much earlier in the secure software development lifecycle (SSDLC). However, some customers may prefer putting a release gate (SLA) only for the production while allowing releases with issues on the QA environment. This enables a customer to be more agile, such that the testing and fixing can be done in parallel.

According to one embodiment herein, the Level 1 plurality of SLA comprises allowed number of critical, high, medium, and low vulnerabilities that are allowed to pass through the release and any number above the defined threshold are blocked from the release. A release is blocked when there are vulnerabilities that exceed the allowed threshold as specified above.

According to one embodiment herein, the Level 2 plurality of SLA defines a list of critical tools, if the defined critical tools are not executed then the release of the software application is blocked from release. The vulnerability management platform allows a customer to integrate as many security scanning tools as possible, such that the customer can experiment with more tools, or for any other reason a tool may not be critical enough to block a release due to its finding. For instance, if a tool is defined as critical, then in that case, if the tool has not executed before the changes being pushed in a release, a release can be blocked. The premise for this is that any untested code can potentially carry critical security flaws, unless cleared by the security tools. Furthermore, an organization can set a policy that all code should be checked by the list of defined "critical" tools before a release can be cleared for deployment—even if there are currently no security vulnerabilities/findings in the system at the given time.

According to one embodiment herein, the Level 3 plurality of SLA defines flexible risk parameters, including threat intelligence score, and compliance deviance to be implemented. This is to enable customers to take even more mature guardrails/controls around a release. For example, the threat intelligence score or scores of all findings helps to allow or disallow a release for a customer, and compliance deviance includes halting a release if a release is deviating from a particular compliance. For instance, if the GDPR requirement is violated, even if all other criteria defined are met, the release may be halted. Furthermore, the compliance deviance comprises ASVS 4.0.2, OWASP Top 10-2021, CWE Top-25, PCI DSS 3.2, and HIPAA.

According to one embodiment herein, the method for managing vulnerability by the vulnerability management platform is provided. The vulnerability management platform helps to ingest vulnerabilities from various security scanning tools, penetration testing, or even manual security research or secure code review results. The method includes ingesting findings/vulnerabilities from vulnerability detection tools, normalizing the vulnerabilities to a common framework, or deduplicating findings/vulnerabilities, while the same findings are present repeatedly. The method further includes triaging the vulnerabilities automatically or manually based on business logic and creating reports on vulnerability data using application security posture management (ASPM). Furthermore, the method includes enabling remediation workflows of the identified and prioritized vulnerabilities and automatically or manually creating application lifecycle management tickets without leaving the platform. The method further includes monitoring the efficiency of the program by tracking due dates and each team's service level of meeting pre-agreed due dates.

According to one embodiment herein, the method for checking the vulnerability state for a given release build is provided. The method comprises triggering scanning from various scanning tools by a build automation platform tool, such as Jenkins, whenever a release is built. The method further comprises pulling scans through API of scanning tools by the vulnerability management platform or pushing the scan results by the build automation platform tool. The method further comprises calling vulnerability management platform release gating API by the build automation platform tool, such as Jenkins to evaluate the conditions defined, while considering all the reported vulnerabilities. Furthermore, vulnerability management platforms have integrations with various scanning tools including infrastructure security scan, SAST, SCA, secret scanning, LAST, DAST, bug bounty platforms, RASP, and/or manual pen testing.

According to one embodiment herein, the method for recording the release of software application and the status of the vulnerability state by the vulnerability management platform is provided. The method comprises calling the vulnerability management platform release gate API by a build automation platform and informing the vulnerability management platform that a new build is created. The method further includes providing the status whether the release can be deployed or not by the vulnerability management platform and moving forward with the deployment or stopping the deployment by the build automation platform. Furthermore, the method includes providing script, including Python or Bash to a user in their build automation system by the vulnerability management platform.

According to one embodiment herein, the method for security risk identification in a software application also includes exception release approval by setting a baseline, includes ignoring the specific vulnerabilities by the subsequent release attempts in the baseline, and applying to any incremental vulnerabilities. While setting the baseline, an authorized person may take a call to allow the current set of vulnerabilities to pass through, even though the exception breaks the plurality of SLA defined. In addition, when significant changes are made to a codebase of the software application during an initial onboarding, the release fails repeatedly till all the issues are resolved. The baseline is a set of vulnerabilities at the time when the baseline is created, post the baseline any release which is a subset of the vulnerabilities already defined in the baseline are allowed to pass, and any new vulnerability/vulnerabilities that do not belong to the defined baseline are tested again, against the release gate criteria. Moreover, if the new release fails based on the newly discovered vulnerabilities, the release is blocked.

According to one embodiment herein, a computer-implemented system for security risk identification and controlling release management of software applications with vulnerable codes is provided. The system comprises a software application build generation module configured to generate a release build and comprises a repository, a build tool unit, a script unit and an artifactory. The repository is configured to store code for a software application. The build tool unit is configured to generate the release build through continuous integration and the script unit is integrated to the build tool unit, configured to invoke an API of a vulnerability management platform module, to check for vulnerability state for a given release based on various scanning tools. Furthermore, the artifactory is configured to store the release build generated by the build tool unit. The system also comprises a vulnerability management platform module configured to check the vulnerabilities and detect security risks for the software application, and comprises an SLA unit, an App security tool unit, an API, and a graphical user interface (GUI). The SLA unit is configured to define a plurality of service level agreement (SLA) for a release globally or specifically. Defining the plurality of SLA globally includes applying the plurality of SLA to all products, subproducts and microservices. Similarly, defining the plurality of SLA specifically includes applying the plurality of SLA to a specific product or subproduct or environment, at an application, microservice or at environment level. The SLA unit further prioritizes the plurality of service level agreement (SLA) into Level 1, Level 2, and Level 3. The Level 1 plurality of SLA comprises an allowed number of critical, high, medium, and low vulnerabilities that are allowed to pass through the release, and any number above the defined threshold are blocked from the release. The Level 2 plurality of SLA defines a list of critical tools, if the defined critical tools are not executed then the release of the software application is blocked from release and the Level 3 plurality of SLA defines flexible risk parameters, including threat intelligence score, and compliance deviance to be implemented. Furthermore, the App security tool unit comprises a plurality of vulnerability scanners checking for the vulnerability state for a given release build by the vulnerability management platform module, which keeps the record of the release of the software application, and also the status of the vulnerability state at that point of time. In addition, the API is configured to provide the state vulnerability state of the release build, based on the plurality of vulnerability scanners present in the App security tool unit; Furthermore, the API allows the release of software application if the vulnerability state is below the threshold and blocking the release of the software application if the vulnerability state is above the threshold, and the vulnerability state is determined by accessing the levels of the plurality of SLA, including Level 1, Level 2, and Level 3. Moreover, the vulnerability management platform module is also configured to record each failed release attempt of the software application, along with the issues present at that point of time and allows exception release approval by setting a baseline.

According to one embodiment herein, the product to which the plurality of SLA of the SLA unit is applied globally is an abstract entity composed of various smaller software deployed separately or all together. Moreover, the products and sub-products help the system define a hierarchy of software applications that are related. Furthermore, the microservice of the SLA unit is a special type of sub-product independently developed, tested, and deployed on shared or independent servers, without requiring the other software that builds the product or application. In addition, the system also provides support for different environments within the product or application, and sub-product to reflect the software development process at an organization and the environment includes code branch, and deployment environment, where DAST security tools can be run.

According to one embodiment herein, the Level 3 plurality of SLA defines flexible and parameters, including threat intelligence score, and compliance deviance to be implemented. This is to enable customers to take even more mature guardrails/controls around a release. For example, the threat intelligence score or scores of all findings by the SLA unit helps to allow or disallow a release for a customer, and compliance deviance includes halting a release if a release is deviating from a particular compliance. For instance, if the GDPR requirement is violated, even if all other criteria defined are met, the release may be halted. Furthermore, the compliance deviance comprises ASVS 4.0.2, OWASP Top 10-2021, CWE Top-25, PCI DSS 3.2, and HIPAA.

According to one embodiment herein, the method for managing vulnerability by the vulnerability management platform module is provided. The vulnerability management platform module helps to ingest vulnerabilities from various security scanning tools, penetration testing, or even manual security research or secure code review results. The method includes ingesting findings/vulnerabilities from vulnerability detection tools, normalizing the vulnerabilities to a common framework, or deduplicating findings/vulnerabilities, while the same findings are present repeatedly. The method further includes triaging the vulnerabilities automatically or manually based on business logic and creating reports on vulnerability data using application security posture management (ASPM). Furthermore, the method includes enabling remediation workflows of the identified and prioritized vulnerabilities and automatically or manually creating application lifecycle management tickets without leaving the platform. The method further includes monitoring the efficiency of the program by tracking due dates and each team's service level of meeting pre-agreed due dates.

According to one embodiment herein, the method for checking the vulnerability state for a given release built by the App security tool unit is provided. The method comprises triggering scanning from various scanning tools by a build automation platform tool, such as Jenkins, whenever a release is built. The method further comprises pulling scans through API of scanning tools by the vulnerability management platform module or pushing the scan results by the build automation platform tool. The method further comprises calling vulnerability management platform module release gating API by the build automation platform tool, such as Jenkins to evaluate the conditions defined, while considering all the reported vulnerabilities. Furthermore, vulnerability management platform modules have integrations with various scanning tools including infrastructure security scan, SAST, SCA, secret scanning, IAST, DAST, bug bounty platforms, RASP, and/or manual pen testing.

According to one embodiment herein, the method for recording the release of software application and the status of the vulnerability state by the vulnerability management platform module is provided. The method comprises calling the vulnerability management platform module release gate API by a build automation platform and informing the vulnerability management platform module that a new build is created. The method further includes providing the status whether the release can be deployed or not by the vulnerability management platform module and moving forward with the deployment or stopping the deployment by the build automation platform. Furthermore, the method includes providing script, including Python or B ash to a user in their build automation system by the vulnerability management platform module.

According to one embodiment herein, the method for security risk identification in a software application also includes exception release approval by setting a baseline by the vulnerability management platform module, includes ignoring the specific vulnerabilities by the subsequent release attempts in the baseline, and applying to any incremental vulnerabilities. While setting the baseline, an authorized person may take a call to allow the current set of vulnerabilities to pass through, even though the exception breaks the plurality of SLA defined. In addition, when significant changes are made to a codebase of the software application during an initial onboarding, the release fails repeatedly till all the issues are resolved. The baseline is a set of vulnerabilities at the time when the baseline is created, post the baseline any release which is a subset of the vulnerabilities already defined in the baseline are allowed to pass, and any new vulnerability/vulnerabilities that do not belong to the defined baseline are tested again, against the release gate criteria. Moreover, if the new release fails based on the newly discovered vulnerabilities, the release is blocked.

The foregoing summary is illustrative only and is not intended to be in any way limiting. In addition to the illustrative aspects, embodiments, and features described above, further aspects, embodiments, and features will become apparent by reference to the drawings and the following detailed description.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 1 illustrates a flowchart depicting a method for security risk identification and controlling release management of software applications with vulnerable codes, according to one embodiment herein.

10

Figure 5A:
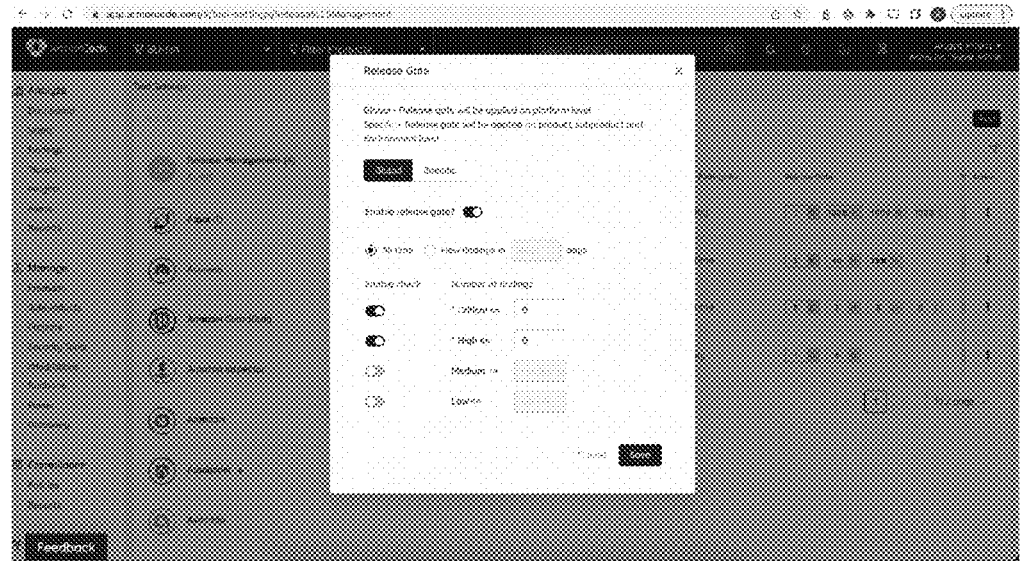
Figure 5B:
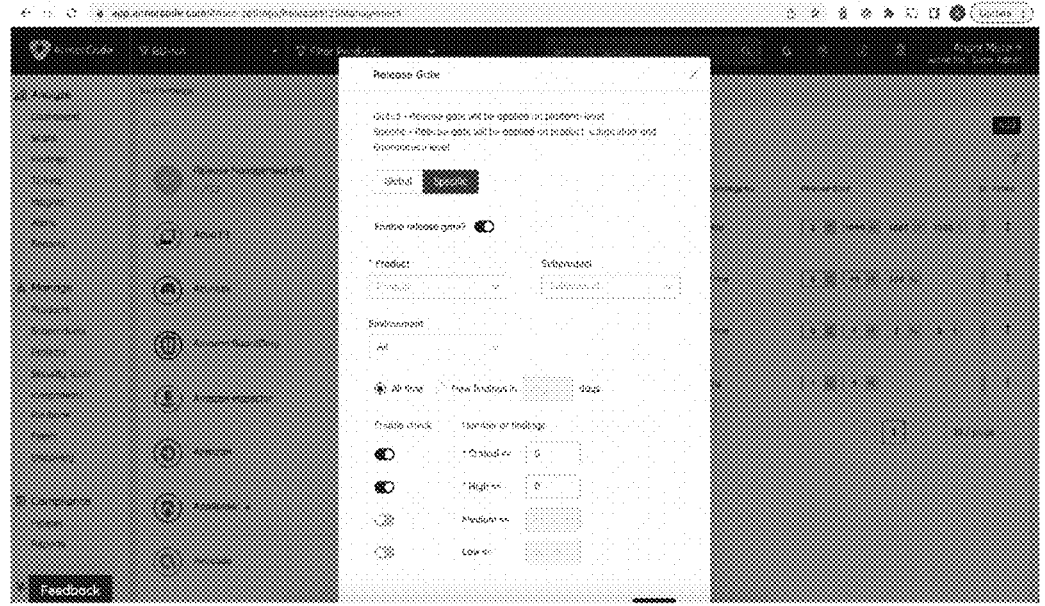

FIG. 5A-5B illustrates a screenshot of Service Level Agreement (SLA) defined globally and specifically, according to one embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The various embodiments herein provide a computer-implemented method and system for security risk identification in a software application as well as integrated tools to direct the efforts of developers to build and maintain secure software.

According to one embodiment herein, a method for security risk identification and controlling release management of software applications with vulnerable codes is provided. The method comprises defining a plurality of service level agreement (SLA) for a release globally or specifically. Defining the plurality of SLA globally includes applying the plurality of SLA to all products, subproducts and microservices. In addition, defining the plurality of SLA specifically includes applying the plurality of SLA to a specific product or subproduct or environment, at an application, microservice or at an environment level. The method further includes prioritizing the plurality of service level agreement (SLA) into Level 1, Level 2, and Level 3. The Level 1 plurality of SLA comprises the allowed number of critical, high, medium, and low vulnerabilities that are allowed to pass through the release and any number above the defined threshold are blocked from the release. The Level 2 plurality of SLA defines a list of critical tools, if the defined critical tools are not executed then the release of the software application is blocked from release and the Level 3 plurality of SLA defines flexible risk parameters, including threat intelligence score, and compliance deviance to be implemented. Furthermore, the method includes downloading a script from a vulnerability management platform either as a bash or a python script and inserting the downloaded script into the release pipeline of a build or continuous integration (CI) tools. The vulnerability management platform ingests vulnerabilities from various security scanning tools, penetration testing, manual security research or secure code review results. The method further includes triggering the release pipeline, the downloaded script embedding the vulnerability management platform API and checking for vulnerability state for a given release build by the vulnerability management platform API based on various scanning tools. Moreover, the vulnerability management platform keeps the record of the release of the software application, and also the status of the vulnerability state at that point of time, such that the vulnerability state of the release crosses the desired threshold, the vulnerability management platform API returns a FAIL code, and the release build pipeline of the software application is blocked. The method further includes allowing the release of software application if the vulnerability state is below the threshold and blocking the release of the software application if the vulnerability state is above the threshold. The vulnerability state is determined by accessing the levels of the plurality of SLA, including Level 1, Level 2, and Level 3. Furthermore, the method includes recording of each failed release attempt of the software application in the vulnerability management platform, along with the issues present at that point of time. The method further includes allowing exception release approval by setting a baseline. The exception release approval includes approving the exception in the vulnerability management platform by an authorized person, which allows the release to go live in a subsequent release attempt on the build pipeline.

According to one embodiment herein, the product to which the plurality of SLA is applied globally is an abstract entity composed of various smaller software deployed separately or all together. The products and sub-products help the method to define a hierarchy of the software applications that are related. An organization that develops software needs to manage their software for maintainability, performance, and team allocation. Completely different software that are separate from each other can be called products or applications. The vulnerability management platform allows customers to set their environment to call this entity either a product or an application.

According to one embodiment herein, the microservice is a special type of sub-product independently developed, tested, and deployed on shared or independent servers, without requiring the other software that builds the product or application. Further, the method being modern application security platform supports this paradigm.

According to one embodiment herein, the method also provides support for different environments within the product or application, and subproduct to reflect the software development process at an organization. The environment includes code branch, and deployment environment where DAST security tools can be run. While defining the plurality of SLA specifically a customer or user needs to define their software inventory in a hierarchical fashion with respect to the vulnerability management platform, such that the findings/vulnerabilities from sub-product/microservices are rolled up to their parent product or application. This helps the customer to view aggregated security flaws/findings/vulnerabilities from all constituent sub-products or microservices in one place and understand overall risk for the entire product. Furthermore, if needed, a customer can access specific sub-products to see specific findings/vulnerabilities. The vulnerability management platform also supports release gating/blocking of release from getting deployed to the QA environment, or to the production environment. Defining a release gate at QA environment shifts the identification and remediation to the left—a developer release will not be accepted in the QA, which helps in identifying, prioritizing, and fixing issues much earlier in the secure software development lifecycle (SSDLC). However, some customers may prefer putting a release gate (SLA) only for the production while allowing releases with issues on the QA environment. This enables a customer to be more agile, such that the testing and fixing can be done in parallel.

According to one embodiment herein, the Level 1 plurality of SLA comprises allowed number of critical, high, medium, and low vulnerabilities that are allowed to pass through the release and any number above the defined threshold are blocked from the release. A release is blocked when there are vulnerabilities that exceed the allowed threshold as specified above.

According to one embodiment herein, the Level 2 plurality of SLA defines a list of critical tools, if the defined critical tools are not executed then the release of the software application is blocked from release. The vulnerability management platform allows a customer to integrate as many security scanning tools as possible, such that the customer can experiment with more tools, or for any other reason a tool may not be critical enough to block a release due to its finding. For instance, if a tool is defined as critical, then in that case, if the tool has not executed before the changes being pushed in a release, a release can be blocked. The premise for this is that any untested code can potentially carry critical security flaws, unless cleared by the security tools. Furthermore, an organization can set a policy that all code should be checked by the list of defined "critical" tools before a release can be cleared for deployment—even if there are currently no security vulnerabilities/findings in the system at the given time.

According to one embodiment herein, the Level 3 plurality of SLA defines flexible risk parameters, including threat intelligence score, and compliance deviance to be implemented. This is to enable customers to take even more mature guardrails/controls around a release. For example, the threat intelligence score or scores of all findings helps to allow or disallow a release for a customer, and compliance deviance includes halting a release if a release is deviating from a particular compliance. For instance, if the GDPR requirement is violated, even if all other criteria defined are met, the release may be halted. Furthermore, the compliance deviance comprises ASVS 4.0.2, OWASP Top 10-2021, CWE Top-25, PCI DSS 3.2, and HIPAA.

According to one embodiment herein, the method for managing vulnerability by the vulnerability management platform is provided. The vulnerability management platform helps to ingest vulnerabilities from various security scanning tools, penetration testing, or even manual security research or secure code review results. The method includes ingesting findings/vulnerabilities from vulnerability detection tools, normalizing the vulnerabilities to a common framework, or deduplicating findings/vulnerabilities, while the same findings are present repeatedly. The method further includes triaging the vulnerabilities automatically or manually based on business logic and creating reports on vulnerability data using application security posture management (ASPM). Furthermore, the method includes enabling remediation workflows of the identified and prioritized vulnerabilities and automatically or manually creating application lifecycle management tickets without leaving the platform. The method further includes monitoring the efficiency of the program by tracking due dates and each team's service level of meeting pre-agreed due dates.

According to one embodiment herein, the method for checking the vulnerability state for a given release build is provided. The method comprises triggering scanning from various scanning tools by a build automation platform tool, such as Jenkins, whenever a release is built. The method further comprises pulling scans through API of scanning tools by the vulnerability management platform or pushing the scan results by the build automation platform tool. The method further comprises calling vulnerability management platform release gating API by the build automation platform tool, such as Jenkins to evaluate the conditions defined, while considering all the reported vulnerabilities. Furthermore, vulnerability management platforms have integrations with various scanning tools including infrastructure security scan, SAST, SCA, secret scanning, LAST, DAST, bug bounty platforms, RASP, and/or manual pen testing.

According to one embodiment herein, the method for recording the release of software application and the status of the vulnerability state by the vulnerability management platform is provided. The method comprises calling the vulnerability management platform release gate API by a build automation platform and informing the vulnerability management platform that a new build is created. The method further includes providing the status whether the release can be deployed or not by the vulnerability management platform and moving forward with the deployment or stopping the deployment by the build automation platform. Furthermore, the method includes providing script, including Python or Bash to a user in their build automation system by the vulnerability management platform.

According to one embodiment herein, the method for security risk identification in a software application also includes exception release approval by setting a baseline, includes ignoring the specific vulnerabilities by the subsequent release attempts in the baseline, and applying to any incremental vulnerabilities. While setting the baseline, an authorized person may take a call to allow the current set of vulnerabilities to pass through, even though the exception breaks the plurality of SLA defined. In addition, when significant changes are made to a codebase of the software application during an initial onboarding, the release fails repeatedly till all the issues are resolved. The baseline is a set of vulnerabilities at the time when the baseline is created, post the baseline any release which is a subset of the vulnerabilities already defined in the baseline are allowed to pass, and any new vulnerability/vulnerabilities that do not belong to the defined baseline are tested again, against the release gate criteria. Moreover, if the new release fails based on the newly discovered vulnerabilities, the release is blocked.

According to one embodiment herein, a computer-implemented system for security risk identification and controlling release management of software applications with vulnerable codes is provided. The system comprises a software application build generation module configured to generate a release build and comprises a repository, a build tool unit, a script unit and an artifactory. The repository is configured to store code for a software application. The build tool unit is configured to generate the release build through continuous integration and the script unit is integrated to the build tool unit, configured to invoke an API of a vulnerability management platform module, to check for vulnerability state for a given release based on various scanning tools. Furthermore, the artifactory is configured to store the release build generated by the build tool unit. The system also comprises a vulnerability management platform module configured to check the vulnerabilities and detect security risks for the software application, and comprises an SLA unit, an App security tool unit, an API, and a graphical user interface (GUI). The SLA unit is configured to define a plurality of service level agreement (SLA) for a release globally or specifically. Defining the plurality of SLA globally includes applying the plurality of SLA to all products, subproducts and microservices. Similarly, defining the plurality of SLA specifically includes applying the plurality of SLA to a specific product or subproduct or environment, at an application, microservice or at environment level. The SLA unit further prioritizes the plurality of service level agreement (SLA) into Level 1, Level 2, and Level 3. The Level 1 plurality of SLA comprises an allowed number of critical, high, medium, and low vulnerabilities that are allowed to pass through the release, and any number above the defined threshold are blocked from the release. The Level 2 plurality of SLA defines a list of critical tools, if the defined critical tools are not executed then the release of the software application is blocked from release and the Level 3 plurality of SLA defines flexible risk parameters, including threat intelligence score, and compliance deviance to be implemented. Furthermore, the App security tool unit comprises a plurality of vulnerability scanners checking for the vulnerability state for a given release build by the vulnerability management platform module, which keeps the record of the release of the software application, and also the status of the vulnerability state at that point of time. In addition, the API is configured to provide the state vulnerability state of the release build, based on the plurality of vulnerability scanners present in the App security tool unit; Furthermore, the API allows the release of software application if the vulnerability state is below the threshold and blocking the release of the software application if the vulnerability state is above the threshold, and the vulnerability state is determined by accessing the levels of the plurality of SLA, including Level 1, Level 2, and Level 3. Moreover, the vulnerability management platform module is also configured to record each failed release attempt of the software application, along with the issues present at that point of time and allows exception release approval by setting a baseline.

According to one embodiment herein, the product to which the plurality of SLA of the SLA unit is applied globally is an abstract entity composed of various smaller software deployed separately or all together. Moreover, the products and sub-products help the system define a hierarchy of software applications that are related. Furthermore, the microservice of the SLA unit is a special type of sub-product independently developed, tested, and deployed on shared or independent servers, without requiring the other software that builds the product or application. In addition, the system also provides support for different environments within the product or application, and sub-product to reflect the software development process at an organization and the environment includes code branch, and deployment environment, where DAST security tools can be run.

According to one embodiment herein, the Level 3 plurality of SLA defines flexible risk parameters, including threat intelligence score, and compliance deviance to be implemented. This is to enable customers to take even more mature guardrails/controls around a release. For example, the threat intelligence score or scores of all findings by the SLA unit helps to allow or disallow a release for a customer, and compliance deviance includes halting a release if a release is deviating from a particular compliance. For instance, if the GDPR requirement is violated, even if all other criteria defined are met, the release may be halted. Furthermore, the compliance deviance comprises ASVS 4.0.2, OWASP Top 10-2021, CWE Top-25, PCI DSS 3.2, and HIPAA.

According to one embodiment herein, the method for managing vulnerability by the vulnerability management platform module is provided. The vulnerability management platform module helps to ingest vulnerabilities from various security scanning tools, penetration testing, or even manual security research or secure code review results. The method includes ingesting findings/vulnerabilities from vulnerability detection tools, normalizing the vulnerabilities to a common framework, or deduplicating findings/vulnerabilities, while the same findings are present repeatedly. The method further includes triaging the vulnerabilities automatically or manually based on business logic and creating reports on vulnerability data using application security posture management (ASPM). Furthermore, the method includes enabling remediation workflows of the identified and prioritized vulnerabilities and automatically or manually creating application lifecycle management tickets without leaving the platform. The method further includes monitoring the efficiency of the program by tracking due dates and each team's service level of meeting pre-agreed due dates.

According to one embodiment herein, the method for checking the vulnerability state for a given release built by the App security tool unit is provided. The method comprises triggering scanning from various scanning tools by a build automation platform tool, such as Jenkins, whenever a release is built. The method further comprises pulling scans through API of scanning tools by the vulnerability management platform module or pushing the scan results by the build automation platform tool. The method further comprises calling vulnerability management platform module release gating API by the build automation platform tool, such as Jenkins to evaluate the conditions defined, while considering all the reported vulnerabilities. Furthermore, vulnerability management platform modules have integrations with various scanning tools including infrastructure security scan, SAST, SCA, secret scanning, IAST, DAST, bug bounty platforms, RASP, and/or manual pen testing.

According to one embodiment herein, the method for recording the release of software application and the status of the vulnerability state by the vulnerability management platform module is provided. The method comprises calling the vulnerability management platform module release gate API by a build automation platform and informing the vulnerability management platform module that a new build is created. The method further includes providing the status whether the release can be deployed or not by the vulnerability management platform module and moving forward with the deployment or stopping the deployment by the build automation platform. Furthermore, the method includes providing script, including Python or B ash to a user in their build automation system by the vulnerability management platform module.

According to one embodiment herein, the method for security risk identification in a software application also includes exception release approval by setting a baseline by the vulnerability management platform module, includes ignoring the specific vulnerabilities by the subsequent release attempts in the baseline, and applying to any incremental vulnerabilities. While setting the baseline, an authorized person may take a call to allow the current set of vulnerabilities to pass through, even though the exception breaks the plurality of SLA defined. In addition, when significant changes are made to a codebase of the software application during an initial onboarding, the release fails repeatedly till all the issues are resolved. The baseline is a set of vulnerabilities at the time when the baseline is created, post the baseline any release which is a subset of the vulnerabilities already defined in the baseline are allowed to pass, and any new vulnerability/vulnerabilities that do not belong to the defined baseline are tested again, against the release gate criteria. Moreover, if the new release fails based on the newly discovered vulnerabilities, the release is blocked.

FIG. 1 illustrates a flowchart depicting a method for security risk identification and controlling release management of software applications with vulnerable codes, according to one embodiment herein. The method 100 comprises defining a plurality of service level agreement (SLA) for a release globally or specifically at step 101. Defining the plurality of SLA globally includes applying the plurality of SLA to all products, subproducts and microservices. In addition, defining the plurality of SLA specifically includes applying the plurality of SLA to a specific product or subproduct or environment, at an application, microservice or at an environment level. The method 100 further includes prioritizing the plurality of service level agreement (SLA) into Level 1, Level 2, and Level 3 at step 102. The Level 1 plurality of SLA comprises the allowed number of critical, high, medium, and low vulnerabilities that are allowed to pass through the release and any number above the defined threshold are blocked from the release. The Level 2 plurality of SLA defines a list of critical tools, if the defined critical tools are not executed then the release of the software application is blocked from release and the Level 3 plurality of SLA defines flexible risk parameters, including threat intelligence score, and compliance deviance to be implemented. Furthermore, the method 100 includes downloading a script from a vulnerability management platform either as a bash or a python script and inserting the downloaded script into the release pipeline of a build or continuous integration (CI) tools at step 103. The vulnerability management platform ingests vulnerabilities from various security scanning tools, penetration testing, manual security research or secure code review results. The method 100 further includes triggering the release pipeline, the downloaded script embedding the vulnerability management platform API at step 104 and checking for vulnerability state for a given release build by the vulnerability management platform API based on various scanning tools at step 105. Moreover, the vulnerability management platform keeps the record of the release of the software application, and also the status of the vulnerability state at that point of time, such that the vulnerability state of the release crosses the desired threshold, the vulnerability management platform API returns a FAIL code, and the release build pipeline of the software application is blocked. The method 100 further includes allowing the release of software application if the vulnerability state is below the threshold and blocking the release of the software application if the vulnerability state is above the threshold at step 106. The vulnerability state is determined by accessing the levels of the plurality of SLA, including Level 1, Level 2, and Level 3. Furthermore, the method 100 includes recording of each failed release attempt of the software application in the vulnerability management platform, along with the issues present at that point of time at step 107. The method 100 further includes allowing exception release approval by setting a baseline at step 108. The exception release approval includes approving the exception in the vulnerability management platform by an authorized person, which allows the release to go live in a subsequent release attempt on the build pipeline.

Figure 2:
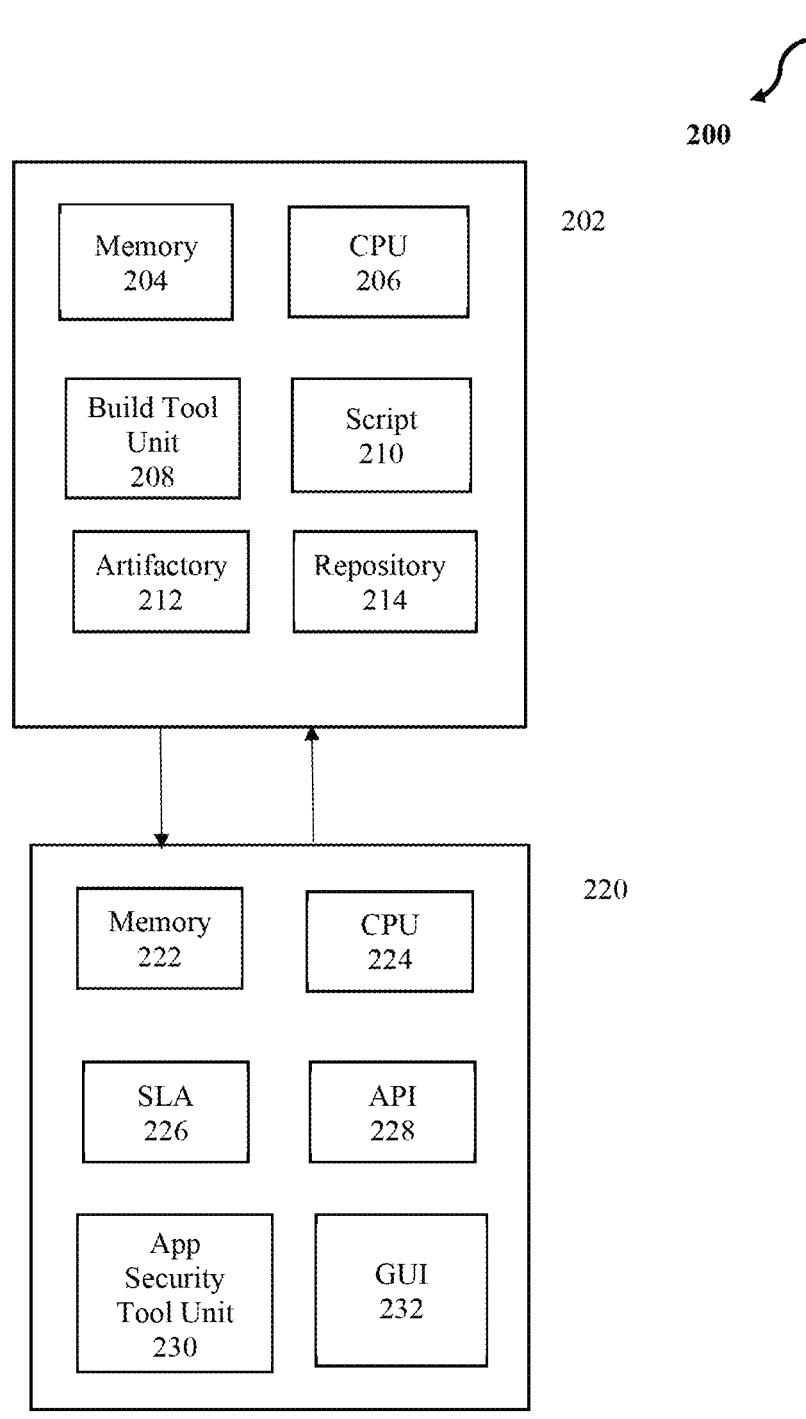
FIG. 2 depicts a computer-implemented system for security risk identification and controlling release management of software applications with vulnerable codes is provided, according to one embodiment herein.

FIG. 2 depicts a computer-implemented system for security risk identification and controlling release management of software applications with vulnerable codes is provided, according to one embodiment herein. The system 200 comprises a software application build generation module 202 configured to generate a release build and comprises a repository 214, a build tool unit 208, a script unit 210 and an artifactory 212. The repository 214 is configured to store code for a software application. The build tool unit 208 is configured to generate the release build through continuous integration and the script unit is integrated to the build tool unit 208, configured to invoke an API 228 of a vulnerability management platform module 220, to check for vulnerability state for a given release based on various scanning tools. Furthermore, the artifactory 212 is configured to store the release build generated by the build tool unit 208. The system 200 also comprises a vulnerability management platform module 220 configured to check the vulnerabilities and detect security risks for the software application, and comprises an SLA unit 226, an App security tool unit 230, an API 228, and a graphical user interface (GUI) 232. The SLA unit 226 is configured to define a plurality of service level agreement (SLA) for a release globally or specifically. Defining the plurality of SLA globally includes applying the plurality of SLA to all products, subproducts and microservices. Similarly, defining the plurality of SLA specifically includes applying the plurality of SLA to a specific product or subproduct or environment, at an application, microservice or at environment level. The SLA unit further prioritizes the plurality of service level agreement (SLA) into Level 1, Level 2, and Level 3. The Level 1 plurality of SLA comprises an allowed number of critical, high, medium, and low vulnerabilities that are allowed to pass through the release, and any number above the defined threshold are blocked from the release. The Level 2 plurality of SLA defines a list of critical tools, if the defined critical tools are not executed then the release of the software application is blocked from release and the Level 3 plurality of SLA defines flexible risk parameters, including threat intelligence score, and compliance deviance to be implemented. Furthermore, the App security tool unit 230 comprises a plurality of vulnerability scanners checking for the vulnerability state for a given release build by the vulnerability management platform module, which keeps the record of the release of the software application, and also the status of the vulnerability state at that point of time. In addition, the API 228 is configured to provide the state vulnerability state of the release build, based on the plurality of vulnerability scanners present in the App security tool unit 230. Furthermore, the API 228 allows the release of software application if the vulnerability state is below the threshold and blocking the release of the software application if the vulnerability state is above the threshold, and the vulnerability state is determined by accessing the levels of the plurality of SLA, including Level 1, Level 2, and Level 3. Moreover, the vulnerability management platform module 220 is also configured to record each failed release attempt of the software application, along with the issues present at that point of time and allows exception release approval by setting a baseline.

Figure 3:
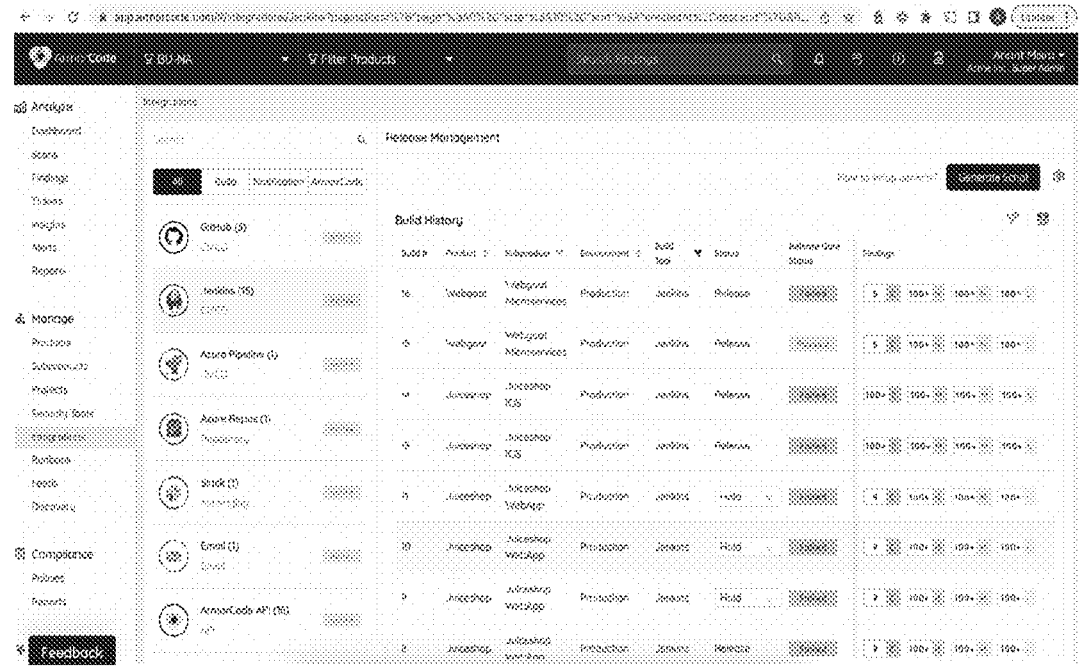
FIG. 3 illustrates a screenshot of findings of vulnerabilities in a list of release build attempted for a software application, according to one embodiment herein.

FIG. 3 illustrates a screenshot of findings of vulnerabilities in a list of release build attempted for a software application, according to an embodiment herein. FIG. 3 illustrates a screenshot of findings of vulnerabilities for each release build attempted for a software application. For instance, FIG. 3 illustrates for a build 14, product Juiceshop, build tool Jenkins the status is Release and release gate status is failed as there are 100+ critical, 100+ high, 100+ medium and 100+ low vulnerability findings.

Figure 4A:
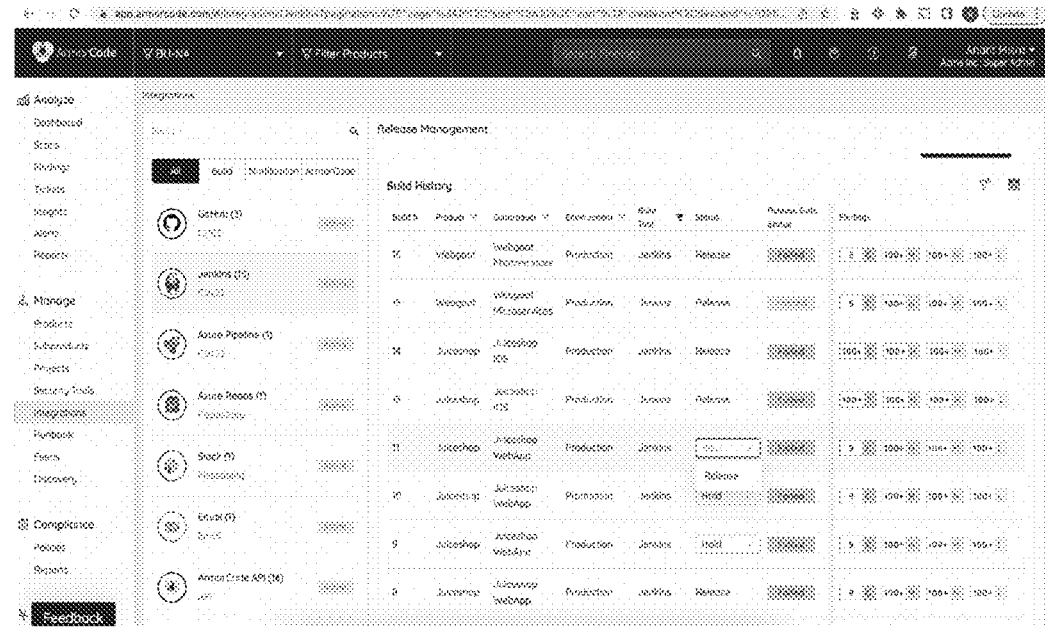
FIGS. 4A-4B illustrates a screenshot of an option to approve a release build as an exception and reason for exception, according to one embodiment herein.
Figure 4B:
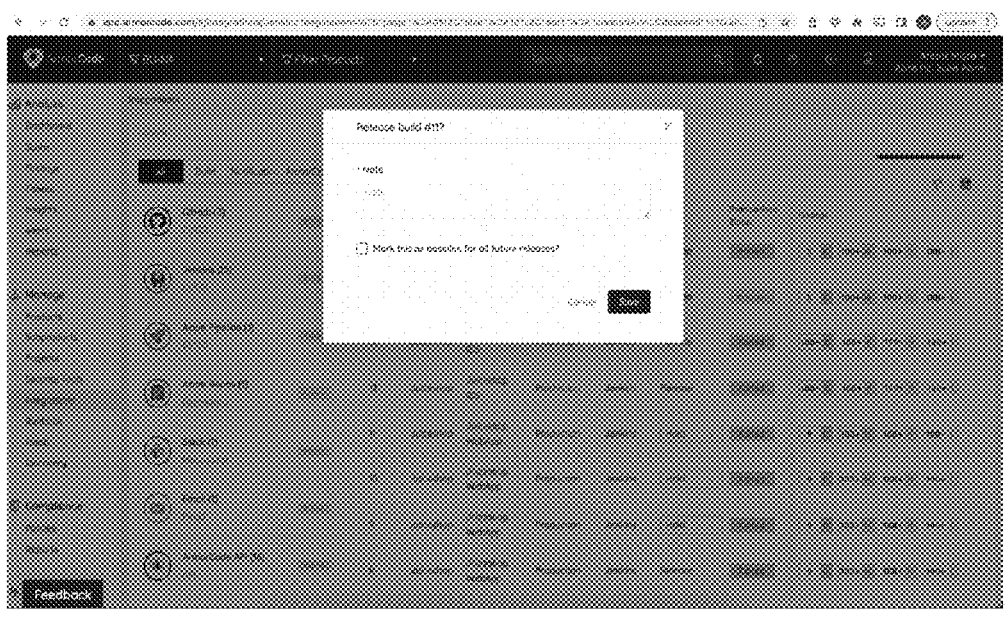

FIG. 4A-4B illustrates a screenshot of an option to approve a release build as an exception and reason for exception, according to an embodiment herein. FIG. 4A illustrates a screenshot of an option to approve a release build as an exception, even though the SLA fails. FIG. 4A illustrates a screenshot that the system 100 provides an option to approve a release build as an exception release approval, even though the SLA fails to meet the defined threshold. For instance, FIG. 4A illustrates for a build 11, product Juiceshop, subproduct Juiceshop WebApp the status although was on hold, it can be converted to release through exception release approval option by an authorized person. FIG. 4B illustrates a screenshot of capturing reason for exception and marking baseline or exception for release build 11.

FIG. 5A-5B illustrate a screenshot of Service Level Agreement (SLA) defined globally and specifically, according to an embodiment herein. FIG. 5A illustrates a screenshot of Service Level Agreement (SLA) defined globally and FIG. 5B illustrates a screenshot of Service Level Agreement (SLA) defined specifically such as specific product or subproduct or environment.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail above. It should be understood, however, that it is not intended to limit the disclosure to the forms disclosed, but on the contrary, the disclosure is to cover all modifications, equivalents, and alternatives falling within the scope of the disclosure.

The embodiments herein disclose a computer-implemented system and method for security risk identification and controlling release management of software applications with vulnerable codes. In addition, the embodiments herein also provide a method and a system for security risk identification in a software application as well as integrated tools to direct the efforts of developers to build and maintain secure software. The technical advantages envisaged by the embodiment herein include the vulnerability management platform has an advantage that it can take inputs from a large number of security scanning tools and become a central decision-making platform to block/pass a release. The other technical advantages include providing a unique approach of defining a plurality of Service Level Agreement (SLA) to control a release build for a software application by checking vulnerabilities. Furthermore, the method is flexible enough to adapt in most complicated enterprises and different Software Development Life Cycle (SDLC) processes.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method for identifying security risks and controlling a release of at least one software applications containing vulnerable codes, the method comprising the steps of:

a. defining a plurality of service level agreements (SLAs) for the release of the software application, wherein the release includes a global release of the software application and a specific release of the software application, and wherein defining the plurality of SLAs for the global release further includes applying the plurality of SLAs to products, subproducts, and microservices, and wherein defining the plurality of SLAs for the specific release further includes applying the plurality of SLAs to at least one of a specific product, a specific subproduct, and a specific environment, at at least one of an application level, a microservice level, and an environment level;

b. prioritizing the plurality of service level agreements (SLAs) into Level 1 SLAs, Level 2 SLAs, and Level 3 SLAs, and wherein the Level 1 SLAs comprise a predetermined number of critical, high, medium, and low vulnerabilities allowed to pass through the release, and wherein any number of the critical, high, medium, and low vulnerabilities exceeding the predetermined number of critical, high, medium, and low vulnerabilities are blocked from the release, and wherein the Level 2 SLAs define a list of critical tools, that when not executed, cause the release of the software application to be blocked, and wherein the Level 3 SLAs define flexible risk parameters, including a threat intelligence score and compliance deviance to be implemented during the release of the software application;

c. downloading a script from a vulnerability management platform, wherein the script contains a vulnerability management platform API, and inserting downloaded script into a release build pipeline created by a build and continuous integration (CI) tools, and wherein the vulnerability management platform ingests vulnerabilities from a plurality of vulnerability detection tools, penetration testing results, manual security research results, and secure code review results;

d. triggering the release build pipeline and the downloaded script embedding the vulnerability management platform API;

e. checking a vulnerability state for a specific release build of the software application by the vulnerability management platform API, by using at least one scanning tools, and wherein the vulnerability management platform records the release of the software application and a status of the vulnerability state at a time of the release of the software application, and wherein in an event the vulnerability state of the release exceeds a predetermined threshold, the vulnerability management platform API returns a FAIL code and blocks the release build pipeline of the software application;

f. allowing the release of the software application if the vulnerability state is determined to be below the predetermined threshold and blocking the release of the software application if the vulnerability state is determined to be above the predetermined threshold, and wherein the vulnerability state is determined based on the Level 1 SLAs, the Level 2 SLAs, and the Level 3 SLAs;

g. recording each failed release attempt of the software application in the vulnerability management platform, along with issues present at a time of the failed release attempt; and h. implementing an exception release approval procedure by setting a baseline, the baseline defining a predetermined set of vulnerabilities, and wherein the exception release approval procedure includes approving exceptions in the software application and allowing the release of the software application in a subsequent release attempt performed on the release build pipeline, and wherein the step of implementing the exception release approval by setting the baseline further includes:

ignoring specific vulnerabilities in the baseline during the subsequent release attempt and applying the baseline to incremental vulnerabilities;

allowing a current set of vulnerabilities to pass through, even when the exceptions corresponding to the current set of vulnerabilities violate at least one of the plurality of SLAs;

and wherein the release of the software application is allowed over the baseline, in an event the software application contains vulnerabilities that are a subset of the predetermined set of vulnerabilities defining the baseline, and wherein new vulnerabilities that do not belong to the predetermined set of vulnerabilities are tested against a predefined release gate criteria.

2. The method according to claim 1, wherein the products to which the plurality of SLAs are applied for the global release are abstract entities composed of a plurality of smaller software products, and wherein the products and the sub-products define a hierarchy of related software applications.

3. The method according to claim 1, wherein the method (100) further includes supporting different environments within the products, and the subproducts to reflect a software development process at an organization, and wherein the different environments comprise code branch and deployment environment.

4. The method according to claim 1, wherein the threat intelligence score is used to selectively allow and disallow the release of the software application, and wherein implementation of the compliance deviance includes halting the release in an event the release is deviating from a specific compliance, and wherein the compliance deviance is implemented based on security rules selected from a group consisting of Application Security Verification Standard (ASVS) 4.0.2, Open Web Application Security Project (OWASP) Top 10-2021, Common Weakness Enumeration (CWE) Top-25, Payment Card Industry data Security Standard (PCI DSS) 3.2, and Health Insurance Portability and Accountability Act (HIPAA) security standards.

5. The method according to claim 1, wherein the step of downloading the script from the vulnerability management platform further includes the following steps: a. ingesting the vulnerabilities, by the vulnerability management platform, from the plurality of vulnerability detection tools, the penetration testing results, the manual security research results, and the secure code review results; b. normalizing the vulnerabilities to a common framework, and deduplicating the vulnerabilities, in an event substantially similar vulnerabilities are identified; c. triaging the vulnerabilities; d. creating reports on vulnerability data using application security posture management (ASPM) tools; and e. creating remediation workflows for identified and prioritized vulnerabilities.

6. The method according to claim 1, wherein the at least one scanning tool includes an infrastructure security scan tool, a Static Application Security Testing (SAST) tool, a Software Composition Analysis (SCA) tool, a secret scanning tool, Interactive Application Security Testing (IAST) tool, Dynamic Application Security Testing (DAST) tool, bug bounty platforms, Runtime Application Self Protection (RASP) tool, and a manual pen testing tool.

7. The method according to claim 1, wherein the method further includes the steps of:
a. triggering, by a build automation platform, a vulnerability management platform release gate API;
b. informing the vulnerability management platform about creation of the specific release build of the software application;
c. triggering the vulnerability management platform to provide the status of the vulnerability state, and to determine whether the release can be deployed;
d. selectively deploying the specific release build of the software application, by the build automation platform; and
e. generating the script, by the vulnerability management platform.

8. A computer-implemented system for identifying security risks and controlling a release of at least one software application containing vulnerable codes, said system comprising:
a processor; and
a memory storing computer-executable instructions, which when executed by the processor cause the processor to:
generate a specific release build of the software application, and check for a vulnerability state of the specific release build check for vulnerabilities and the security risks in the software application;
define a plurality of service level agreements for a release of the software application, and wherein the release includes a global release of the software application and a specific release of the software application, and wherein defining the plurality of SLAs for the global release further includes applying the plurality of SLAs to all products, subproducts, and microservices, and wherein defining the plurality of SLAs for the specific release further includes applying the plurality of SLAs to at least one of a specific product, a specific subproduct, and a specific environment, at at least one of an application level, a microservice level, and an environment level;
prioritize the plurality of service level agreements (SLAs) into Level 1 SLAs, Level 2 SLAs, and Level 3 SLAs, and wherein the Level 1 SLAs comprise a predetermined number of critical, high, medium, and low vulnerabilities allowed to pass through the release, and wherein any number of the critical, high, medium, and low vulnerabilities exceeding the predetermined number of critical, high, medium, and low vulnerabilities are blocked from the release, and wherein the Level 2 SLAs define a list of critical tools, that when not executed, cause the release of the software application to be blocked, and wherein the Level 3 SLAs define flexible risk parameters, including a threat intelligence score and compliance deviance to be implemented during the release of the software application;
download a script from a vulnerability management platform, wherein the script contains a vulnerability management platform API, and insert downloaded script into a release build pipeline created by a build and continuous integration (CI) tool, and trigger the vulnerability management platform to ingest vulnerabilities from a plurality of vulnerability detection tools, penetration testing results, manual security research results, and secure code review results;
trigger the release build pipeline and the downloaded script embedding the vulnerability management platform API;
check the vulnerability state for the specific release build by using at least one scanning tool, and trigger the vulnerability management platform to record the release of the software application and a status of the vulnerability state at a time of the release of the software application;
trigger the vulnerability management platform API to return a FAIL code and block the release build pipeline of the software application in an event the vulnerability state of the release exceeds a predetermined threshold;
trigger the vulnerability management platform API to allow the release of the software application in an event the vulnerability state is determined to be below the predetermined threshold and further trigger the vulnerability management platform API to blocking the release of the software application if the vulnerability state is determined to be above the predetermined threshold, and further trigger the vulnerability management platform API to determine the vulnerability state based on the Level 1 SLAs, the Level 2 SLAs, and the Level 3 SLAs;
trigger the vulnerability management platform to record each failed release attempt of the software application, along with issues present at a time of the failed release attempt; and
implement an exception release approval procedure by setting a baseline, the baseline defining a predetermined set of vulnerabilities, and wherein the exception release approval procedure includes approving exceptions in the software application and allowing the release of the software application in a subsequent release attempt performed on the release build pipeline, and wherein an implementation of the exception release approval procedure by setting the baseline further includes:
ignoring specific vulnerabilities in the baseline during the subsequent release attempt and applying the baseline to incremental vulnerabilities;
allowing a current set of vulnerabilities to pass through, even when the exceptions corresponding to the current set of vulnerabilities violate at least one of the plurality of SLAs;

and wherein the release of the software application is allowed over the baseline, in an event the software application contains vulnerabilities that are a subset of the predetermined set of vulnerabilities defining the baseline, and wherein new vulnerabilities that do not belong to the predetermined set of vulnerabilities are tested against a predefined release gate criteria.

9. The system according to claim 8, wherein the products to which the plurality of SLAs are applied for the global release are abstract entities composed of a plurality of smaller software products, and wherein the products and the subproducts define a hierarchy of related software applications.

10. The system according to claim 8, wherein the system supports for different environments within the products and the subproducts to reflect a software development process, and wherein the different environments comprise code branch and deployment environment.

11. The system according to claim 8, wherein the threat intelligence score is used to selectively allow and disallow the release of the software application, and wherein implementation of the compliance deviance includes halting the release in an event the release is deviating from a specific compliance, and wherein the compliance deviance is implemented based on security rules selected from a group consisting of Application Security Verification Standard (ASVS) 4.0.2, Open Web Application Security Project (OWASP) Top 10-2021, Common Weakness Enumeration (CWE) Top-25, Payment Card Industry data Security Standard (PCI DSS) 3.2, and Health Insurance Portability and Accountability Act (HIPAA) security standards.

12. The system according to claim 8, wherein the processor is further configured to: a. trigger the vulnerability management platform to ingest the vulnerabilities from the plurality of vulnerability detection tools, the penetration testing results, the manual security research results, and the secure code review results; b. normalize the vulnerabilities to a common framework, and deduplicate the vulnerabilities, in an event substantially similar vulnerabilities are identified; c. triaging the vulnerabilities; d. creating reports on vulnerability data using application security posture management (ASPM) tools; and e. creating remediation workflows for identified and prioritized vulnerabilities.

13. The system according to claim 8, wherein the at least one scanning tool includes an infrastructure security scan tool, a Static Application Security Testing (SAST) tool, a Software Composition Analysis (SCA) tool, a secret scanning tool, Interactive Application Security Testing (IAST) tool, Dynamic Application Security Testing (DAST) tool, bug bounty platforms, Runtime Application Self Protection (RASP) tool, and a manual pen testing tool.

14. The system according to claim 8, wherein the processor is further configured to:
   a. trigger a build automation platform to invoke a vulnerability management platform release gate API;
   b. informing the vulnerability management platform about creation of the specific release build of the software application;
   c. trigger the vulnerability management platform to provide the status of the vulnerability state, and to determine whether the release can be deployed;
   d. trigger the build automation platform to selectively deploy the specific release build of the software application; and
   e. trigger the vulnerability management platform to generate the script.

\* \* \* \* \*